(No Model.)

A. A. HOUGHTON.
WEIGHING SCALE.

No. 270,221. Patented Jan. 9, 1883.

Witnesses
Jos. Scheuk
F. W. Braun

Inventor,
Alfred A. Houghton.
By James Sangster
Atty.

UNITED STATES PATENT OFFICE.

ALFRED A. HOUGHTON, OF BUFFALO, NEW YORK.

WEIGHING-SCALE.

SPECIFICATION forming part of Letters Patent No. 270,221, dated January 9, 1883.

Application filed May 9, 1881. (No model.)

*To all whom it may concern:*

Be it known that I, ALFRED A. HOUGHTON, a citizen of the United States, residing in Buffalo, in the county of Erie and State of New York, have invented certain new and useful Improvements in Scales for Weighing, of which the following is a specification.

The object of my invention is to provide a convenient means for weighing net weight, gross weight, or tare, the arrangement being such that after the gross weight is balanced by the balancing poise or poises and any part of the load is taken therefrom the beam will move up instead of down, or in a direction opposite to its course in the usual way of weighing under such conditions, in which position of the beam the weighing-poise may be moved forward, as in ordinary weighing, to produce a balance; but instead of indicating the gross weight, as would be the case with a scale-beam constructed in the usual manner, it will indicate the amount taken from the gross weight, as the pivot upon which the load is hung is inside of the fulcrum-pivot or between the fulcrum-pivot and the weighing-poise, while the gross-weight-balancing poise is arranged so as to operate on a portion of the beam extending back of or outside of the fulcrum-pivot.

Figure 1:
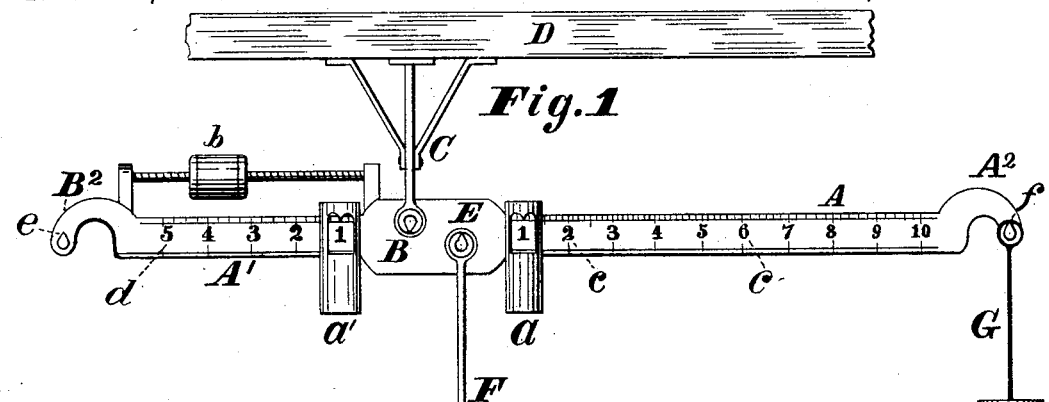
Figure 2:
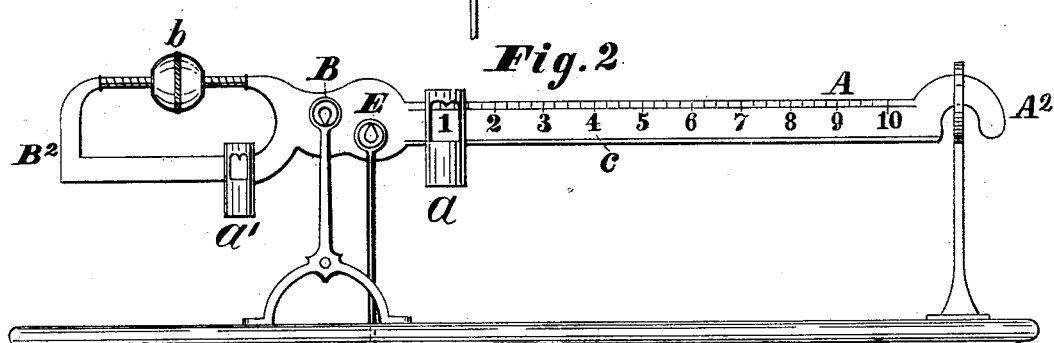
Figure 3:
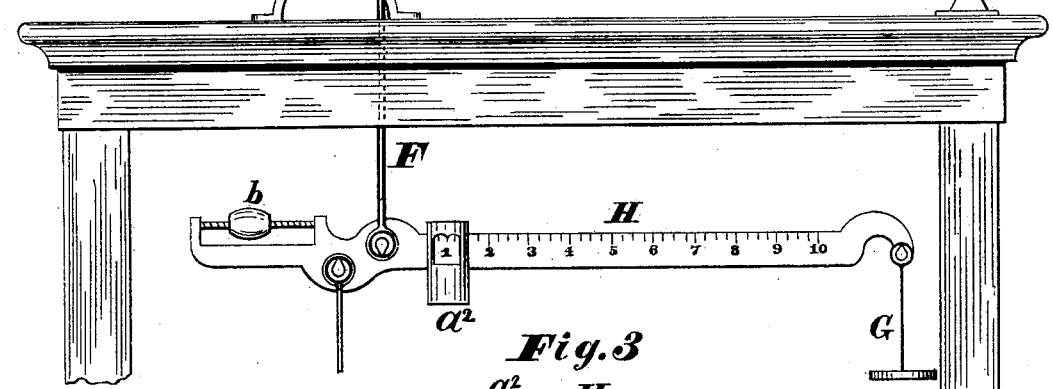

Figure 1 is a side elevation, showing a single beam having the pivot for supporting the load arranged between the fulcrum-pivot and the weighing-poise. Fig. 2 represents a side elevation of a scale-beam of similar construction for indicating net weight, in combination with a beam pivoted thereto by suitable connections and arranged below it for balancing the gross weight; and Fig. 3 is a side elevation of a scale-beam for indicating net weight, having the pivot for supporting the load between the fulcrum-pivot and the weighing-poise, in combination with a beam arranged above it and connected thereto by pivots and a suitable connecting-link.

A represents the beam for indicating net weight. It is supported by the fulcrum-pivot B, and a holding frame or bar, C, connected to the beam D above it; but it may be held in a suitable bearing constructed in any well-known manner, and arranged either above or below the beam.

The pivot E for supporting the load is placed between the fulcrum-pivot B and the weighing-poise $a$, and is connected in the usual way with the load-supporting rod F, which rod may be connected with a scale-pan or with the well-known mechanism of a platform-scale.

The back end of the beam A is provided with a backward extension or balancing-beam, A', and forming a part of it. It is provided with a poise, $a'$, and may have the usual balancing-ball, $b$, if required. The beam A is provided with figures $c$, for indicating the net weight, arranged in the ordinary way from left to right, so as to be operated in the usual manner. The figures $d$ on the beam or portion A' are arranged in reverse order from right to left; but the figures on the portion A' are not always necessary. For instance, if only the net weight is required, a balance-ball, $b$, or a poise, $a'$, or both, would answer the purpose. At one or both ends of the beam it may, in some cases, be well to connect the usual device, G, in the usual way to the pivots $e$ or $f$, for holding additional weights. It will be seen from this construction of the beam A that the load is supported by the pivot E and its connections between the fulcrum-pivot B and the weighing poise $a$, and consequently when the load is put onto the scale the nose $A^2$ of the beam A will be moved downward instead of upward, as would be the case with a beam constructed in the usual way. When the beam A is thus brought down by the weight of the load it is made to balance by moving out toward the tail $B^2$ of the portion A' or its equivalent a balancing-weight, $b$, or a poise, $a'$, until the required balance is obtained. In this condition of the beam it will be readily seen that if any portion of the load be taken therefrom the nose $A^2$ will move up instead of moving down, as would be the case with a beam of ordinary construction under the same conditions, and that the net weight or the weight taken from the load may be ascertained by moving the poise $a$ along the beam A in the same manner as in the usual process of weighing; but it will be seen that the net weight only and not the gross weight is thus ascertained. It being well known to combine an auxiliary beam with an ordinary beam for the purpose of increasing its capacity, an equivalent to the balancing portion A' would be a balancing-beam, as shown in Figs. 2 and 3, and this may be necessary for scales of larger size or for heavier weights. In Fig. 2 the balancing-beam H is placed below the beam A, and connected thereto by the rod F, so that when the load is on the beam A will operate in exactly the same way as before, while the nose of the beam H is moved up by the weight of the load, and if the poise $a$ or balancing-ball $b$ is not sufficient to balance it the poise $a^2$ on the beam H may be moved until a balance is obtained. In Fig. 3 the balancing-beam H is arranged above the beam A and connected thereto by an ordinary link, F', connecting with the pivots $e'$ and $f$. In this arrangement the beam A operates in the same manner as before and indicates the net weight.

In adapting the scale to weigh or indicate either the net or gross weight, the balancing portion A' of the beam A should be provided with figures arranged in reverse order, as shown in Fig. 1.

I claim—

A scale-beam having its load-supporting pivot E between its fulcrum-pivot and weighing-poise, and a series of figures, $c$, arranged from left to right, for indicating the net weight, in combination with the balancing portion A', having a series of figures, $d$, arranged from right to left, and a poise for balancing the load or indicating the gross weight.

A. A. HOUGHTON.

Witnesses:
JAMES SANGSTER,
A. J. SANGSTER.